US012626218B2

(12) United States Patent
Gundlapalli et al.

(10) Patent No.: US 12,626,218 B2
(45) Date of Patent: May 12, 2026

(54) SYSTEMS AND METHODS FOR ASSESSING A CONDITION OF A PACKAGE IN A FACILITY

(71) Applicant: HONEYWELL INTERNATIONAL INC., Charlotte, NC (US)

(72) Inventors: Karthik Gundlapalli, Hyderabad (IN); Sunil Mishra, Hyderabad (IN); Ashwini Kumar Vangala, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 136 days.

(21) Appl. No.: 18/372,139

(22) Filed: Sep. 25, 2023

(65) Prior Publication Data

US 2025/0104009 A1 Mar. 27, 2025

(51) Int. Cl.
*G06Q 10/087* (2023.01)
*G01D 21/02* (2006.01)

(52) U.S. Cl.
CPC ........... *G06Q 10/087* (2013.01); *G01D 21/02* (2013.01)

(58) Field of Classification Search
CPC .............................. G06Q 10/087; G01D 21/02
See application file for complete search history.

(56) References Cited

U.S. PATENT DOCUMENTS

| | | | | |
|---|---|---|---|---|
| 7,050,938 | B1 * | 5/2006 | Prater | G06Q 10/087 |
| | | | | 702/182 |
| 12,099,961 | B2 * | 9/2024 | Lawson | G06Q 10/0633 |
| 2020/0100115 | A1 * | 3/2020 | Skaaksrud | H04L 41/06 |
| 2020/0223635 | A1 * | 7/2020 | Govindaswamy | B65G 1/1375 |

OTHER PUBLICATIONS

Srd̄an Dord̄ević, 'MC sensor—a novel method for measurement of muscle tension', Sensors, Sep. 30, 2011, 11(10), pp. 9411-9425.
Daniele Esposito, 'A Piezoresistive Sensor to Measure Muscle Contraction and Mechanomyography', Sensors, Aug. 4, 2018, 18(8), 2553, 12 pages.

* cited by examiner

*Primary Examiner* — Garcia Ade
(74) *Attorney, Agent, or Firm* — Alston & Bird LLP

(57) ABSTRACT

Various embodiments described herein relate to systems and methods for assessing a condition of a package in a facility. In this regard, first data from one or more first sensors is received once a worker picks the package at a first location in the facility. Further, based on the first data it is determined if the worker is holding the package. If the worker holds the package, second data is received from one or more second sensors such that the one or more second sensors are different from the one or more first sensors. Based on the second data, a package handling pattern for the package is determined. One or more notifications are provided to a mobile device associated with the worker if it is determined that the package handling pattern causes damage to the package.

20 Claims, 8 Drawing Sheets

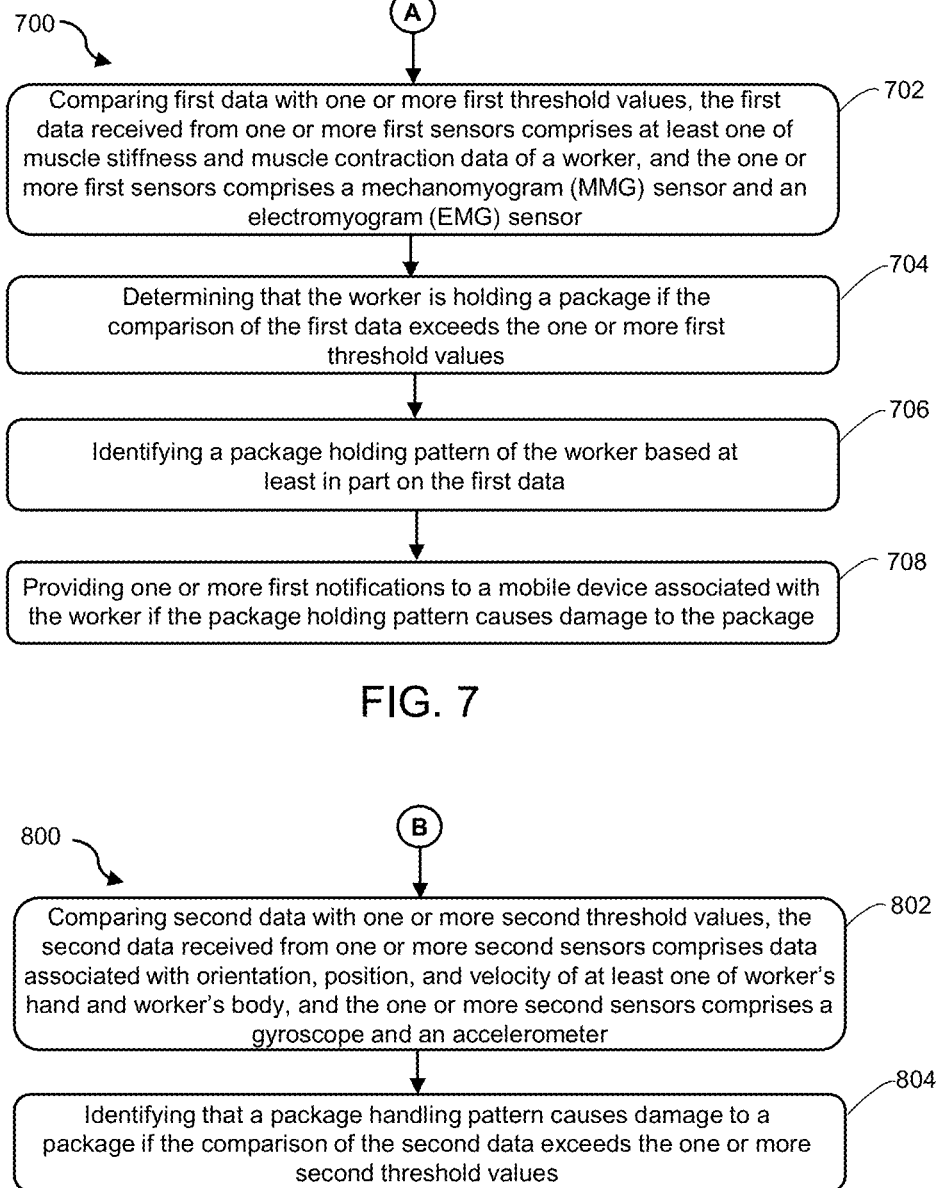

700

(A)

Comparing first data with one or more first threshold values, the first data received from one or more first sensors comprises at least one of muscle stiffness and muscle contraction data of a worker, and the one or more first sensors comprises a mechanomyogram (MMG) sensor and an electromyogram (EMG) sensor — 702

Determining that the worker is holding a package if the comparison of the first data exceeds the one or more first threshold values — 704

Identifying a package holding pattern of the worker based at least in part on the first data — 706

Providing one or more first notifications to a mobile device associated with the worker if the package holding pattern causes damage to the package — 708

Comparing second data with one or more second threshold values, the second data received from one or more second sensors comprises data associated with orientation, position, and velocity of at least one of worker's hand and worker's body, and the one or more second sensors comprises a gyroscope and an accelerometer — 802

Identifying that a package handling pattern causes damage to a package if the comparison of the second data exceeds the one or more second threshold values — 804

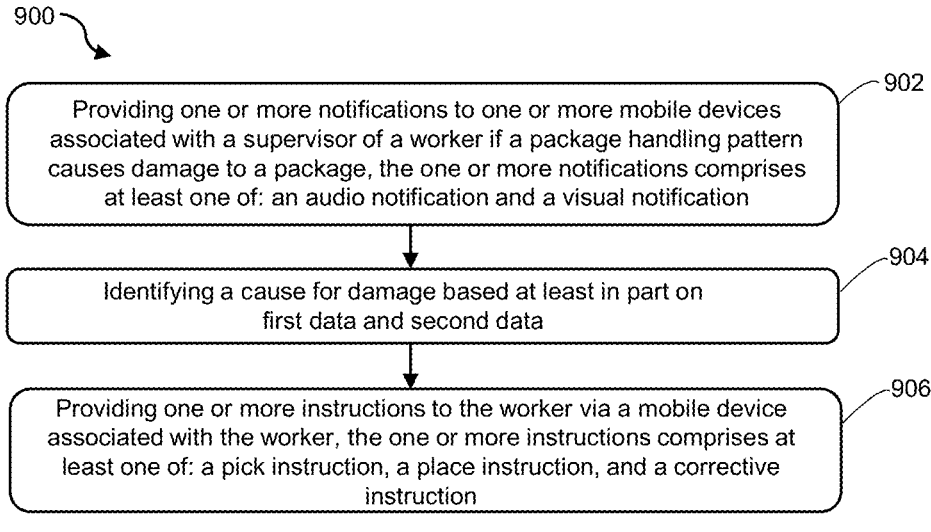

902

Providing one or more notifications to one or more mobile devices associated with a supervisor of a worker if a package handling pattern causes damage to a package, the one or more notifications comprises at least one of: an audio notification and a visual notification

904

Identifying a cause for damage based at least in part on first data and second data

906

Providing one or more instructions to the worker via a mobile device associated with the worker, the one or more instructions comprises at least one of: a pick instruction, a place instruction, and a corrective instruction

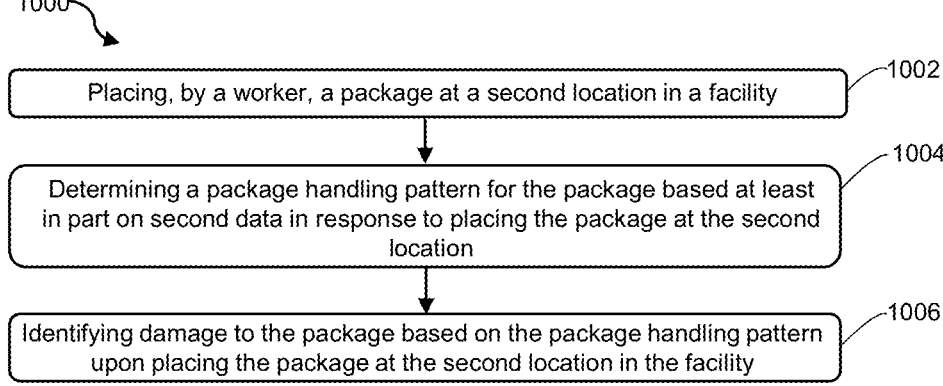

1002

Placing, by a worker, a package at a second location in a facility

1004

Determining a package handling pattern for the package based at least in part on second data in response to placing the package at the second location

1006

Identifying damage to the package based on the package handling pattern upon placing the package at the second location in the facility

FIG. 10

SYSTEMS AND METHODS FOR ASSESSING A CONDITION OF A PACKAGE IN A FACILITY

TECHNICAL FIELD

The present disclosure generally relates to a facility management system. More particularly, the present disclosure relates to assessing a condition of a package in a facility based on package handling patterns by workers.

BACKGROUND

Generally, a facility like a material handling system, a warehouse, a distribution center, a sortation center, etc., often requires handling of numerous packages. Workflows such as picking, placing, sorting, truck loading, and/or the like can be part of package handling process in the facility. As the packages go through these workflows, there is a high possibility that the packages can be subjected to damage. There can be multiple reasons due which the packages can be subjected to damage. One possible reason can be that the packages are mishandled by personnel in the facility. Whereas another reason can be that equipment or environment in the facility is responsible for the damage. There can be several other possible reasons too for the damage. But this eventually results in damaged packages that are unfit to be shipped to an end customer as faulty end products decrease customer satisfaction. In addition, if such damaged packages are shipped to customers, then it may add a burden on the customer to raise a receipt of damaged package and arrange a return/replacement request. This can significantly result in a negative customer experience along with an impact on finances, labor, and brand reputation of the facility. So, it becomes vital to monitor conditions or statuses of the packages as they transit through different workflows in the facility. However, given that the number of packages in the facility is humongous, tracking condition or status of each package has its associated challenges.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 illustrates a flowchart showing a method described in accordance with some example embodiments described herein.

FIG. 8 illustrates a flowchart showing a method described in accordance with some example embodiments described herein.

FIG. 9 illustrates a flowchart showing a method described in accordance with some example embodiments described herein.

FIG. 10 illustrates a flowchart showing a method described in accordance with some example embodiments described herein.

SUMMARY

Figure 1:
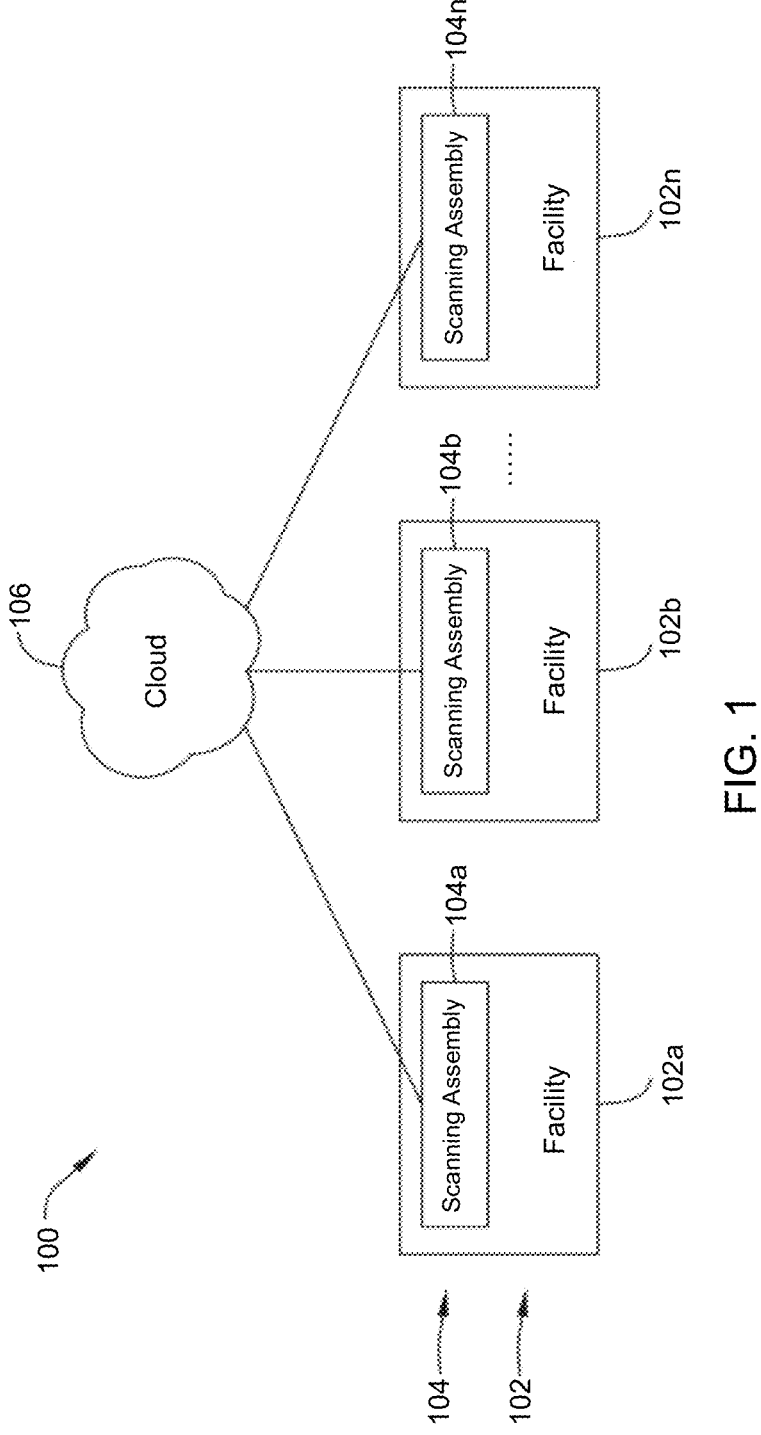
FIG. 1 illustrates a schematic diagram showing a facility management system comprising multiple facilities, in accordance with one or more example embodiments described herein.

The details of some embodiments of the subject matter described in this specification are set forth in the accompanying drawings and the description below. Other features, aspects, and advantages of the subject matter will become apparent from the description, the drawings, and the claims. In accordance with one or more example embodiments of the current disclosure, a method for assessing a condition of a package in a facility is described herein. In some example embodiments, the method comprises picking, by a worker, the package at a first location in the facility. In this regard, in some example embodiments, the method further comprises receiving first data from one or more first sensors in response to picking the package by the worker. Further, in some example embodiments, the method further comprises determining if the worker is holding the package based on the first data received from the one or more first sensors. In this regard, in some example embodiments, the method further comprises receiving second data from one or more second sensors in response to determining that the worker is holding the package, wherein the one or more second sensors are different from the one or more first sensors. Also, in some example embodiments, the method further comprises determining a package handling pattern for the package based at least in part on the second data. Further, in some example embodiments, the method further comprises providing one or more notifications to a mobile device associated with the worker if the package handling pattern causes damage to the package.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

DETAILED DESCRIPTION OF THE DRAWINGS

Reference will now be made in detail to embodiments, examples of which are illustrated in the accompanying drawings. In the following detailed description, numerous specific details are set forth in order to provide a thorough understanding of the various described example embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one example embodiment of the present disclosure, and can be included in more than one example embodiment of the present disclosure (importantly, such phrases do not necessarily refer to the same example embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some example embodiments, or it can be excluded.

One or more example embodiments of the present disclosure may provide an "Internet-of-Things" or "IoT" platform in a facility that uses real-time accurate models and visual analytics to monitor and assess a package condition. In addition, the platform provides analysis related to a pattern in which a user has handled a package to monitor and assess a package condition. The IoT platform is an extensible platform that is portable for deployment in any cloud or data center environment for providing an enterprise-wide, top to bottom view, displaying status of processes, assets, people, and/or safety. Further, the IoT platform of the present disclosure supports end-to-end capability to execute digital twins against process data to provide appropriate predictions related to the package condition based on a pattern in which the user has handled the package.

Supply chain industry is a fast-growing sector and customer satisfaction becomes a key priority for players in this industry. Condition and quality of packages or goods that are delivered to customers plays an important role in customer satisfaction. And the quality of the packages is directly dependent on how the packages are handled in a facility such as a material handling system, a warehouse, a distribution center, a sortation center, and/or the like. At times, it so happens that the packages can be mishandled in the facility leading to faulty or damaged packages. More specifically, the packages are commonly subjected to damages due to improper handling by workers in the facility. There can be several reasons due to which the workers can mishandle the packages. One reason can be that the workers can be temporary employees who lack knowledge on how to handle a package. Another reason can be that the packages can slip or drop from the hands of the workers while carrying the packages in the facility. Further, another reason can be that the workers may unscientifically handle packages to meet or exceed their work requirements. Yet another reason can be that the health of the workers impacts a pattern in which they would be handling the packages.

Given that the facility includes numerous workers, analysis of package handling patterns by each and every worker can be tedious. Though the package handling patterns can be analyzed using videos captured by closed-circuit television (CCTVs) or other cameras in the facility, there can be several associated challenges with this too. Firstly, CCTVs or cameras have angular restrictions which result in incomplete coverage of the workers while they are handling the packages. Due to this, damages that happen outside the reach of the cameras go unobserved. Secondly, the video analysis cannot be scaled up to the numerous workers as it requires a large quantity of computing resources. Thirdly, videos captured by CCTVs or cameras may be unable to provide a fine level of detail that can be a reason behind a specific package handling pattern by the workers. Accordingly, these constraints inhibit analysis of package handling patterns resulting in constant damages to the packages and unobserved reasons behind such damages.

Thus, to address the above challenges, systems and methods described herein analyze and monitor package handling patterns by workers to determine a condition of a package. To achieve this, systems and methods described herein develop a solution that is compact and portable enough to be carried by each worker in a facility. Further, systems and methods described herein collect data associated with activities and health of workers while they are performing tasks associated with the packages to analyze and monitor handling patterns. The analyzed and monitored patterns herein facilitate identification of key aspects associated with package handling by the workers in a facility. Some examples of the key aspects can be, but not limited to determine if a worker is rightly handling a package, predict and alert if there is damage that is likely to happen to a package based on a package handling pattern, identify if a worker needs to be trained based on a package handling pattern, detect if a worker is handling the package roughly, determine if there is risk to safety of a worker, suggest remedial actions to a worker and/or supervisor of the worker, etc.,. Accordingly, the aspects provided by systems and methods described herein avoid potential damages that are likely to happen to the packages in the facility. This results in efficient management of the packages with overall reduction in damage rate to the packages along with improvements on finances, labor, and brand reputation of the facility.

FIG. 1 illustrates a schematic diagram showing an exemplary environment comprising multiple facilities. According to various example embodiments described herein, an exemplary environment 100 comprises one or more facilities 102*a*, 102*b*, . . . 102*n* (collectively "facilities 102"). In some example embodiments, a facility of the one or more facilities 102*a*, 102*b*, . . . 102*n* may correspond to, for example, a commercial building, an institutional building, a monument, a factory, an industry, an IT park, a corporate office, a logistics environment, an airport premises, a transportation hub, a material handling environment, a warehouse, a distribution center, a sortation center, a supply chain environment, and/or the like. In some example embodiments, the one or more facilities 102a, 102b, . . . 102n in the illustrative environment 100 may be of same type. In some example embodiments, the one or more facilities 102a, 102b, . . . 102n in the illustrative environment 100 may be of different type. As it may be understood, in some example embodiments described herein, the facility often includes one or more packages that need to be handled by one or more workers. For example, in a facility like a warehouse, there can be certain set of workers who are responsible for picking packages while there can be another set of workers who are responsible for placing packages. At times, one or the other worker in the facility can mishandle a package intentionally or unintentionally. For example, a package can slip or drop from the hands of a worker while carrying the package in the facility. In another example, a worker can unscientifically handle packages or violate work rules to meet or exceed their work requirements. Yet in another example, a worker can be ignorant of rules that are to be followed to handle a package of a particular type. Exemplary reasons like these act as significant causes for damage to the packages in the facility. Thus, it becomes important to monitor such situations in the facility to avoid significant packages getting damaged.

Accordingly, in one or more example embodiments described herein, each of the one or more facilities 102a, 102b, . . . 102n include one or more scanning assemblies 104a, 104b, . . . 104n (collectively "scanning assemblies 104") to collect data associated with activities and/or health of the one or more workers in each of the one or more facilities 102a, 102b, . . . 102n. In this regard, each of the scanning assemblies 104 can comprise one or more sensors that collects data associated with activities and/or health of the one or more workers while handling a package. In some example embodiments, each of the one or more workers can carry an associated scanning assembly of the scanning assemblies 104 while handling the package in the facility. In this regard, each of the one or more scanning assemblies 104a, 104b, . . . 104n is configured to be worn by a worker in the facility. For example, a scanning assembly can be configured to be worn attached to a worker's hand. In another example, a scanning assembly can be configured to be worn attached to a worker's wrist, palm, arm, and/or the like. Accordingly, each of the scanning assemblies 104 continuously track activities and/or health of the one or more workers in each of the one or more facilities 102a, 102b, . . . 102n while they are performing an operation associated with the package in the facilities 102. Further, according to some example embodiments, the scanning assemblies 104 process the collected data to analyze handling patterns of the one or more workers in the facilities 102. In addition, in some example embodiments, the scanning assemblies 104 provide one or more predictions and/or actions based on the handling patterns of the one or more workers.

Further, in some example embodiments, the one or more facilities 102a, 102b, . . . 102n are operably coupled with a cloud 106, meaning that communication between the cloud 106 and one or more facilities 102a, 102b, . . . 102n can be enabled. In some example embodiments, the one or more scanning assemblies 104a, 104b, . . . 104n are communicatively coupled to the cloud 106. The cloud 106 may represent distributed computing resources, software, platform or infrastructure services which can enable data handling, data processing, data management, and/or analytical operations on the data exchanged & transacted amongst the facilities 102. In accordance with some example embodiments, the data collected by the scanning assemblies 104 is uploaded to the cloud 106 for processing. In this regard, in accordance with some example embodiments, the cloud 106 can process the data to determine package handling patterns of the one or more workers. Also, in some example embodiments, the cloud 106 can generate one or more predictions and/or actions based on the handling patterns. Further, in some example embodiments, the cloud 106 can transmit the one or more predictions and/or actions to a respective scanning assembly of the one or more scanning assemblies 104a, 104b, . . . 104n. Also, in some example embodiments, the cloud 106 can transmit the one or more predictions and/or actions to a mobile device associated with the one or more workers. In some example embodiments, the cloud 106 can also provide one or more alerts on mobile devices associated with the one or more workers and their supervisors in the facility as well.

In some example embodiments, the one or more scanning assemblies 104a, 104b, . . . 104n may operate as intermediary node to transact data between a respective facility and/or the cloud 106. In some example embodiments, each of the one or more scanning assemblies 104a, 104b, . . . 104n is capable of processing and/or filtering the collected data so as to be compatible with the cloud 106. In some example embodiments, each of the one or more facilities 102a, 102b, . . . 102n may comprise a respective gateway to transact data between a respective facility and/or the cloud 106. Accordingly, in some example embodiments, gateway may operate as intermediary node to transact data between a respective facility and/or the cloud 106. In some example embodiments, the cloud 106 includes one or more servers that may be programmed to communicate with the one or more facilities 102a, 102b, . . . 102n and to exchange data as appropriate. The cloud 106 may be a single computer server or may include a plurality of computer servers. In some example embodiments, the cloud 106 may represent a hierarchal arrangement of two or more computer servers, where perhaps a lower level computer server (or servers) processes telemetry data, for example, while a higher-level computer server oversees operation of the lower level computer server or servers.

Figure 2:
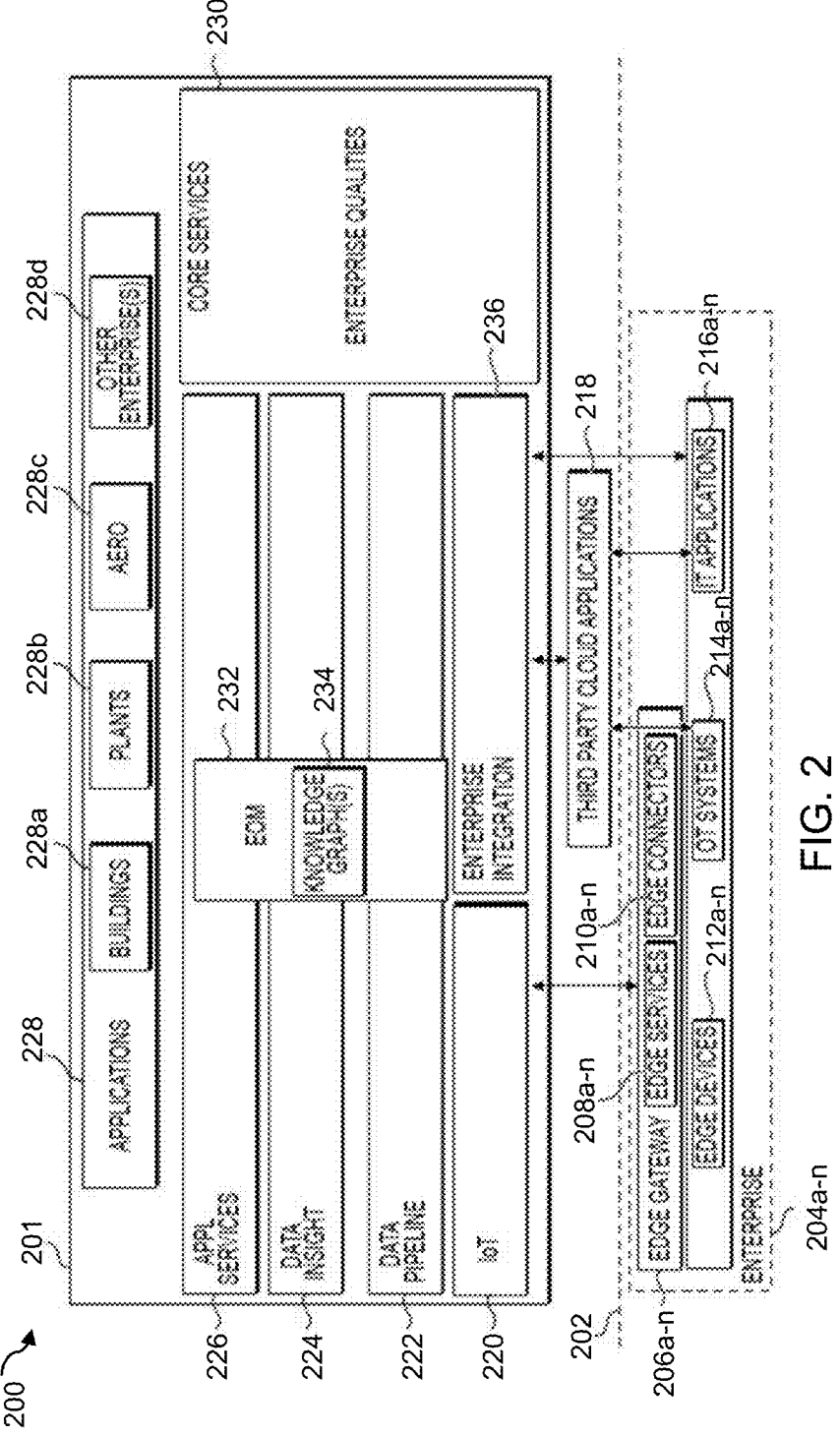
FIG. 2 illustrates a schematic diagram showing a framework of an Internet-of-Things (IoT) platform utilized in a facility management system, in accordance with one or more example embodiments described herein.

FIG. 2 illustrates a schematic diagram showing a framework of an Internet-of-Things (IoT) platform utilized in a facility management system, in accordance with one or more example embodiments described herein. The framework 200 illustrated in FIG. 2 of the current disclosure is associated with the IoT platform 201. The IoT platform 201 of the present disclosure is a platform that uses real-time accurate models and/or visual analytics to deliver insights associated with package handling patterns in order to achieve sustained peak performance of a facility or an enterprise 204a-204n. The IoT platform 201 is an extensible platform that is portable for deployment in any cloud or data center environment for providing an enterprise-wide, top to bottom view, displaying the status of processes, assets, people, and safety. Further, the IoT platform 201 supports end-to-end capability to execute digital twins against process data to provide appropriate predictions associated with a package condition based on the package handling patterns by one or more workers in the facility or enterprise 204a-204n.

As shown in FIG. 2, the framework 200 of the IoT platform 201 comprises a number of layers including, for example, an IoT layer 220, an enterprise integration layer

236, a data pipeline layer 222, a data insight layer 224, an application services layer 226, and an applications layer 228. The IoT platform 201 also includes a core services layer 230 and an extensible object model (EOM) 232 comprising one or more knowledge graphs 234. The layers 220-230 further include various software components that together form each layer 220-230. For example, in one or more embodiments, each layer 220-230 includes one or more of the modules, models, engines, databases, services, applications, or combinations thereof. In some embodiments, the layers 220-230 are combined to form fewer layers. In some embodiments, some of the layers 220-230 are separated into separate, more numerous layers. In some embodiments, some of the layers 220-230 are removed while others may be added.

The IoT platform 201 is a model-driven architecture. Thus, in certain embodiments, the extensible object model (EOM) 232 communicates with each layer 220-230 to contextualize site data of the enterprise 204a-204n using an extensible object model (or "asset model") and knowledge graphs 234 where one or more assets (e.g., edge devices 212a-212n) and one or more processes of the facility or the enterprise 204a-204n are modeled. Also, in some example embodiments, the knowledge graphs 234 comprise information and/or models related to the package handling patterns associated with the one or more workers in the facility. The knowledge graphs 234 of EOM 232 are configured to store the models in a central location. The knowledge graphs 234 define a collection of nodes and links that describe real-world connections that enable smart systems. Also, in some example embodiments, the knowledge graphs 234 define standard package handling patterns and/or rules to handle one or more packages in the facility. As used herein, a knowledge graph 234: (i) describes real-world entities (e.g., edge devices 212a-212n) and their interrelations organized in a graphical interface; (ii) defines possible classes and relations of entities in a schema; (iii) enables interrelating arbitrary entities with each other; (iv) covers various topical domains; and/or (v) includes package handling patterns associated with the one or more workers in the facility. In other words, the knowledge graphs 234 define large networks of entities (e.g., edge devices 212a-212n), semantic types of the entities, properties of the entities, and relationships between the entities. Thus, the knowledge graphs 234 describe a network of "things" that are relevant to a specific domain, an enterprise, or a facility. Knowledge graphs 234 are not limited to abstract concepts and relations, but can also contain instances of objects, such as, for example, documents and datasets. In some example embodiments, the knowledge graphs 234 include resource description framework (RDF) graphs. As used herein, a "RDF graph" is a graph data model that formally describes the semantics, or meaning, of information. The RDF graph also represents metadata (e.g., data that describes data). In some example embodiments, the knowledge graphs 234 may comprise relation between activities and/or health profile of a worker and a package handling pattern. In some example embodiments, the knowledge graphs 234 can be used by the facility management system to provide one or more predictions associated with damage that is likely to happen for the one or more packages in the facility. In some example embodiments, the knowledge graphs 234 can be used by the facility management system to provide one or more notifications related to damage and/or a package handling pattern of the worker. In some example embodiments, the knowledge graphs 234 can be used by the facility management system to generate one or more service cases to address damages of the one or more packages in the facility. In some example embodiments, the knowledge graphs 234 can be used by the facility management system to provide one or more actions to handle the one or more packages in the facility. According to various example embodiments, the knowledge graphs 234 also include a semantic object model. The semantic object model is a subset of a knowledge graph 234 that defines semantics for the knowledge graph 234. For example, the semantic object model defines the schema for the knowledge graph 234.

As used herein, EOM 232 is a collection of application programming interfaces (APIs) that enables seeded semantic object models to be extended. For example, the EOM 232 of the present disclosure enables a customer's knowledge graph 234 to be built subject to constraints expressed in the customer's semantic object model. Thus, the knowledge graphs 234 are generated by customers (e.g., enterprises or organizations) to create models of the edge devices 212a-212n and/or processes of an enterprise 204a-204n, and the knowledge graphs 234 are input into the EOM 232 for visualizing the models (e.g., the nodes and links). In this regard, in some example embodiments, knowledge graphs 234 are input into the EOM 232 for visualizing package handling patterns associated with each of the one or more workers in an enterprise 204a-204n.

The models describe assets and/or processes (e.g., the nodes) of an enterprise (e.g., the edge devices 212a-212n and/or package handling patterns of the workers) and describe the relationship of the assets and/or processes with other components (e.g., the links). In some example embodiments, edge devices 212a-212n can correspond to the scanning assemblies 104 as described in FIG. 1 of the present disclosure. Further, in some example embodiments, the models also describe the schema (e.g., describe what the data is), and therefore the models are self-validating. For example, in one or more embodiments, the model describes the type of sensors mounted on any given asset (e.g., edge device 212a-212n) and the type of data that is being sensed by each sensor. In another example, the model describes a package handling pattern for a specific worker and one or more causes for the package handling pattern. According to various embodiments, a key performance indicator (KPI) framework is used to bind properties of the assets and/or processes in the extensible object model 232 to inputs of the KPI framework. Accordingly, the IoT platform 201 is an extensible, model-driven end-to-end stack including: two-way model sync and secure data exchange between the edge and the cloud, metadata driven data processing (e.g., rules, calculations, and aggregations), and model driven visualizations and applications. As used herein, "extensible" refers to the ability to extend or update a data model to include new package handling patterns, new service cases, new rules, new properties, new columns, new fields, new classes, new tables, and new relations. Thus, the IoT platform 201 is extensible with regards to edge devices 212a-212n and the applications that handle those devices 212a-212n. For example, when new edge devices 212a-212n are added to an enterprise 204a-204n system, the new devices 212a-212n will automatically appear in the IoT platform 201. With this, the corresponding applications 228 can understand and use the data from the new devices 212a-212n to manage the new devices and/or processes in the facility or the enterprise 204a-204n thereby increasing overall throughput of the facility and significantly reducing damages to the one or more packages in the facility.

In some cases, asset templates are used to facilitate configuration of instances of edge devices 212a-212n in the model using common structures. An asset template defines typical properties, attributes, or parameters for the edge devices 212a-212n of a given facility or enterprise 204a-204n for a certain type of device or asset. The knowledge graph 234 can automatically map a tag to the attribute based on naming conventions, parsing, and matching the tag and attribute descriptions and/or by comparing the behavior of time series data with expected behavior. Further, in some example embodiments, package handling templates are used to define one or more rules and/or patterns to handle the one or more packages in the facility. The knowledge graph 234 can automatically map data collected by one or more scanning assemblies to a rule or pattern in the package handling templates and/or compare a behavior of the collected time series data with expected behavior.

In certain example embodiments, a modeling phase includes an onboarding process for syncing the models between the edge and the cloud. In some example embodiments, the modeling phase can also include construction of the knowledge graph 234 using pre-defined package handling patterns and/or collected data using one or more scanning assemblies. For example, in one or more example embodiments, the onboarding process includes a simple onboarding process, a complex onboarding process, and/or a standardized rollout process. The simple onboarding process includes the knowledge graph 234 receiving raw model data from the edge and running context discovery algorithms to generate the model. The context discovery algorithms read the context of the edge naming conventions of the edge devices 212a-212n and determine what the naming conventions refer to. For example, in one or more example embodiments, the knowledge graph 234 receives "TMP" during the modeling phase and determines that "TMP" relates to "temperature". The generated models and vectors are then published. In certain example embodiments, the complex onboarding process includes the knowledge graph 234 receiving the raw model data, receiving point history data, and receiving site survey data. According to various example embodiments, the knowledge graph 234 then uses these inputs to run the context discovery algorithms. According to various example embodiments, the generated models are edited and then the models are published. The standardized rollout process includes manually defining standard models in the cloud and pushing the models to the edge.

The IoT layer 220 includes one or more components for device management, data ingest, and/or command/control of the edge devices 212a-212n. The components of the IoT layer 220 enable data to be ingested into, or otherwise received at, the IoT platform 201 from a variety of sources. For example, in one or more example embodiments, data is ingested from the edge devices 212a-212n through process historians or laboratory information management systems. The IoT layer 220 is in communication with edge connectors 210a-210n installed on edge gateways 206a-206n through network 202, and the edge connectors 210a-210n send the data securely to the IoT platform 201. In this regard, the edge connectors 210a-210n can transmit data collected by scanning assemblies 104 to the IoT platform 201. In some example embodiments, only authorized data is sent to the IoT platform 201, and the IoT platform 201 only accepts data from authorized edge gateways 206a-206n and/or edge devices 212a-212n. According to various example embodiments, data is sent from the edge gateways 206a-206n to the IoT platform 201 via direct streaming and/or via batch delivery. Further, after any network or system outage, data transfer will resume once communication is re-established and any data missed during the outage will be backfilled from the source system or from a cache of the IoT platform 201. According to various example embodiments, the IoT layer 220 also includes components for accessing time series, alarms and events, and transactional data via a variety of protocols.

The enterprise integration layer 236 includes one or more components for events/messaging, file upload, and/or REST/OData. The components of the enterprise integration layer 236 enable the IoT platform 201 to communicate with third party cloud applications 218, such as any application(s) operated by an enterprise in relation to its edge devices. For example, the enterprise integration layer 236 connects with enterprise databases, such as guest databases, customer databases, financial databases, patient databases, etc. The enterprise integration layer 236 provides a standard application programming interface (API) to third parties for accessing the IoT platform 201. The enterprise integration layer 236 also enables the IoT platform 201 to communicate with the OT systems 214a-214n and IT applications 216a-216n of the enterprise 204a-204n. Thus, the enterprise integration layer 236 enables the IoT platform 201 to receive data from the third-party applications 218 rather than, or in combination with, receiving the data from the edge devices 212a-212n directly.

The data pipeline layer 222 includes one or more components for data cleansing/enriching, data transformation, data calculations/aggregations, and/or API for data streams. Accordingly, in one or more example embodiments, the data pipeline layer 222 pre-processes and/or performs initial analytics on the collected data derived from scanning assemblies 104. The data pipeline layer 222 executes advanced data cleansing routines including, for example, data correction, mass balance reconciliation, data conditioning, component balancing and simulation to ensure the desired information is used as a basis for further processing. The data pipeline layer 222 also provides advanced and fast computation capabilities. In some example embodiments, the data pipeline layer 222 can process the feedback to identify new package handling patterns, new service cases, new tags, new properties, new columns, new fields, new classes, new tables, and new relations, etc.,. For example, in one or more example embodiments, cleansed data is run through enterprise-specific digital twins. According to various example embodiments, the enterprise-specific digital twins include a reliability advisor containing process models to determine the current operation and fault models to trigger any early detection and determine an appropriate resolution.

According to various example embodiments, the data pipeline layer 222 employs models and templates to define calculations and analytics. Additionally or alternatively, according to various example embodiments, the data pipeline layer 222 employs models and templates to define how the calculations and analytics relate to one or more assets (e.g., the edge devices 212a-212n) and/or one or more package handling patterns. For example, in an embodiment, a fan template defines fan efficiency calculations such that every time a fan is configured, the standard efficiency calculation is automatically executed for the fan. In another example, a template can define a normal package handling pattern for a specific type of package. In this regard, the template can be executed based on data collected by scanning assemblies when the specific type of package is handled in the facility. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 212a-212n) instance is created, any associated calculation instances are also created with their input and output parameters linked to the appropriate attributes of the asset (e.g., edge device 212a-212n).

According to various example embodiments, the IoT platform 201 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 204a-204n performance to identify issues or opportunities, and the potential causes or drivers of the issues or opportunities. The IoT platform 201 includes rich hierarchical symptom-fault models to identify abnormal conditions and their potential consequences. For example, in one or more embodiments, the IoT platform 201 drill downs from a high-level condition to understand the contributing factors, as well as determining the potential impact a lower level condition may have. There may be multiple fault models for a given enterprise 204a-204n looking at different aspects such as process, equipment, control, and/or operations. According to various example embodiments, each fault model identifies issues and opportunities in their domain, and can also look at the same core problem from a different perspective. According to various example embodiments, an overall fault model is layered on top to synthesize the different perspectives from each fault model into an overall assessment of the situation and point to the true root cause.

According to various example embodiments, when a fault or opportunity is identified, the IoT platform 201 provides one or more corrective actions and/or recommendations to be taken in the facility. The IoT platform 201 according to some example embodiments performs analysis on data collected by the scanning assemblies to identify a fault or opportunity. For example, the IoT platform 201 performs analysis on data collected by the scanning assemblies 104 to identify a damage to a package in the facility. In another example, the IoT platform 201 performs analysis on data collected by the scanning assemblies 104 to identify a potential damage that is likely to happen to a package and provide a prediction for the same. According to some example embodiments, the IoT platform 201 utilizes one or more templates of the data pipeline layer 222 to perform analysis on data collected by the scanning assemblies 104 and provide one or more corrective actions and/or recommendations. Initially, the corrective actions and/or recommendations are based on expert knowledge that has been pre-programmed into the system by process and equipment experts. A recommendation services module presents this information in a consistent way regardless of source, and supports workflows to track, close out, and document the recommendation follow-up. According to various example embodiments, the recommendation follow-up is employed to improve the overall knowledge of the system over time as existing recommendations are validated (or not) or new cause and effect relationships are learned by users and/or analytics. Also, in some example embodiments, the IoT platform 201 provides one or more alerts and/or notifications based on the one or more corrective actions and/or recommendations.

According to various example embodiments, the models and/or templates are used to accurately predict what will occur before it occurs and interpret the status of the installed base. Thus, the IoT platform 201 enables workers to quickly initiate maintenance measures when irregularities occur. In some example embodiments, the IoT platform 201 creates one or more preventive actions to address the irregularities in the enterprise 204a-204n. In this regard, an exemplary preventive action can correspond to a suggestion of providing a training to a particular worker. According to various example embodiments, the digital twin architecture of the IoT platform 201 employs a variety of modeling techniques. According to various example embodiments, the modeling techniques include, for example, rigorous models, fault detection and diagnostics (FDD), descriptive models, predictive maintenance, prescriptive maintenance, process optimization, and/or any other modeling technique.

According to various example embodiments, the rigorous models are converted from process design simulation. In this manner, in certain example embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various example embodiments, the descriptive models identifies a problem and the predictive models determines possible damage levels and maintenance options.

Predictive maintenance includes predictive analytics models developed based on rigorous models and statistic models, such as, for example, principal component analysis (PCA) and partial least square (PLS). According to various example embodiments, machine learning methods are applied to train models for damage prediction. According to various example embodiments, predictive maintenance leverages FDD-based algorithms to continuously monitor individual package handling pattern of a worker. Predictive modeling is then applied to a selected condition indicator that deteriorates in time. Prescriptive maintenance includes determining one or more corrective actions and when it should be performed based on actual conditions. According to various example embodiments, prescriptive analysis selects the right solution based on the company's capital, operational, and/or other requirements.

The data insight layer 224 includes one or more components for time series databases (TDSB), relational/document databases, data lakes, blob, files, images, and videos, and/or an API for data query. According to various example embodiments, when raw data is received at the IoT platform 201 (say, from scanning assemblies 104), the raw data is stored as time series tags or events in warm storage (e.g., in a TSDB) to support interactive queries and to cold storage for archive purposes. According to various example embodiments, data is sent to the data lakes for offline analytics development. According to various example embodiments, the data pipeline layer 222 accesses the data stored in the databases of the data insight layer 224 to perform analytics, as detailed above.

The application services layer 226 includes one or more components for rules engines, workflow/notifications, KPI framework, insights (e.g., actionable insights), decisions, recommendations, machine learning, and/or an API for application services. The application services layer 226 enables building of applications 228*a-d*. The applications layer 228 includes one or more applications 228*a-d* of the IoT platform 201. For example, according to various example embodiments, the applications 228*a-d* includes a buildings application 228*a*, a plants application 228*b*, an aero application 228*c*, and other enterprise applications 228*d*. According to various example embodiments, the applications 228 includes general applications for portfolio management, asset management, tracking package handling patterns, autonomous control, and/or any other custom applications. According to various example embodiments, portfolio management includes the KPI framework and a flexible user interface (UI) builder. According to various example embodiments, asset management includes asset performance, asset health, and/or asset predictive maintenance. According to various example embodiments, autonomous control includes energy optimization and/or predictive maintenance. As detailed above, according to various example embodiments, the general applications 228*a-d* is extensible such that each application 228*a-d* is configurable for the different types of enterprises 204*a*-204*n* (e.g., buildings application 228*a*, plants application 228*b*, aero application 228*c*, and other enterprise applications 228*d*).

The applications layer 228 also enables visualization of performance of the enterprise 204*a*-204*n*. For example, dashboards provide a high-level overview with drill downs to support deeper investigations. In one or more example embodiments, the dashboards provide a view of worker performance with respect to package handling patterns. Also, in some example embodiments, the dashboards provide a view of a number of damaged goods for a handling pattern for each worker. Yet in some example embodiments, the dashboards provide a view of one or more corrective actions and/or recommendations to prevent or address irregularities in handling the packages. Recommendation summaries give users prioritized actions to address current or potential issues and opportunities. Data analysis tools support ad hoc data exploration to assist in troubleshooting and process improvement. In one or more example embodiments, the dashboards may represent a ranking of the one or more workers.

The core services layer 230 includes one or more services of the IoT platform 201. According to various example embodiments, the core services 230 include data visualization, data analytics tools, security, scaling, and monitoring. According to various example embodiments, the core services 230 also include services for tenant provisioning, single login/common portal, self-service admin, UI library/ UI tiles, identity/access/entitlements, logging/monitoring, usage metering, API gateway/dev portal, and the IoT platform 201 streams.

Figure 3:
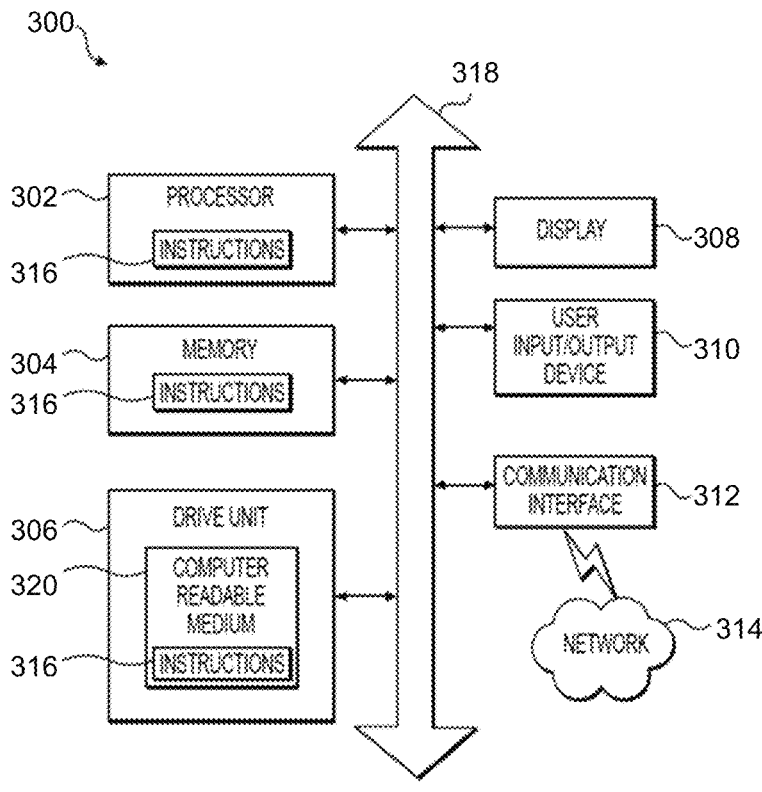
FIG. 3 illustrates a schematic diagram showing an exemplary implementation of a controller that may execute techniques in accordance with one or more example embodiments described herein.

FIG. 3 illustrates a schematic diagram showing an exemplary implementation of a controller that may execute techniques in accordance with one or more example embodiments described herein. In one or more example embodiments, controller 300 described herein may include a set of instructions that can be executed to cause the controller 300 to perform any one or more of the methods or computer based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 318. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 308, such as a liquid crystal display (LCD), an organic light emitting diode (OLED), a flat panel display, a solid-state display, a cathode ray tube (CRT), a projector, a printer or other now known or later developed display device for outputting determined information. The display 308 may act as an interface for the user to see the functioning of the processor 302, or specifically as an interface with the software stored in the memory 304 or in the drive unit 306. Additionally or alternatively, the controller 300 may include an input/output device 310 configured to allow a user to interact with any of the components of controller 300. The input/output device 310 may be a number pad, a keyboard, or a cursor control device, such as a mouse, or a joystick, touch screen display, remote control, or any other device operative to interact with the controller 300. The controller 300 may also or alternatively include drive unit 306 implemented as a disk or optical drive. The drive unit 306 may include a computer-readable medium 320 in which one or more sets of instructions 316, e.g. software, can be embedded. Further, the instructions 316 may embody one or more of the methods or logic as described herein. The instructions 316 may reside completely or partially within the memory 304 and/or within the processor 302 during execution by the controller 300. The memory 304 and the processor 302 also may include computer-readable media as discussed above.

In some systems, a computer-readable medium 320 includes instructions 316 or receives and executes instructions 316 responsive to a propagated signal so that a device connected to a network 314 can communicate voice, video, audio, images, or any other data over the network 314. Further, the instructions 316 may be transmitted or received over the network 314 via a communication port or interface 312, and/or using a bus 318. The communication port or interface 312 may be a part of the processor 302 or may be a separate component. The communication port or interface 312 may be created in software or may be a physical connection in hardware. The communication port or interface 312 may be configured to connect with a network 314, external media, the display 308, or any other components in controller 300, or combinations thereof. The connection with the network 314 may be a physical connection, such as a wired Ethernet connection or may be established wirelessly as discussed below. Likewise, the additional connections with other components of the controller 300 may be physical connections or may be established wirelessly. The network 314 may alternatively be directly connected to a bus 318.

While the computer-readable medium 320 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 320 may be non-transitory, and may be tangible. The computer-readable medium 320 can include a solid-state memory such as a memory card or other package that houses one or more non-volatile read-only memories. The computer-readable medium 320 can be a random-access memory or other volatile re-writable memory. Additionally or alternatively, the computer-readable medium 320 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 314. The network 314 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 314 may include wide area networks (WAN), such as the Internet, local area networks (LAN), campus area networks, metropolitan area networks, a direct connection such as through a Universal Serial Bus (USB) port, or any other networks that may allow for data communication. The network 314 may be configured to couple one computing device to another computing device to enable communication of data between the devices. The network 314 may generally be enabled to employ any form of machine-readable media for communicating information from one device to another. The network 314 may include communication methods by which information may travel between computing devices. The network 314 may be divided into sub-networks. The sub-networks may allow access to all of the other components connected thereto or the sub-networks may restrict access between the components. The network 314 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art.

Such standards are periodically superseded by faster or more efficient equivalents having essentially the same functions. Accordingly, replacement standards and protocols having the same or similar functions as those disclosed herein are considered equivalents thereof. It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
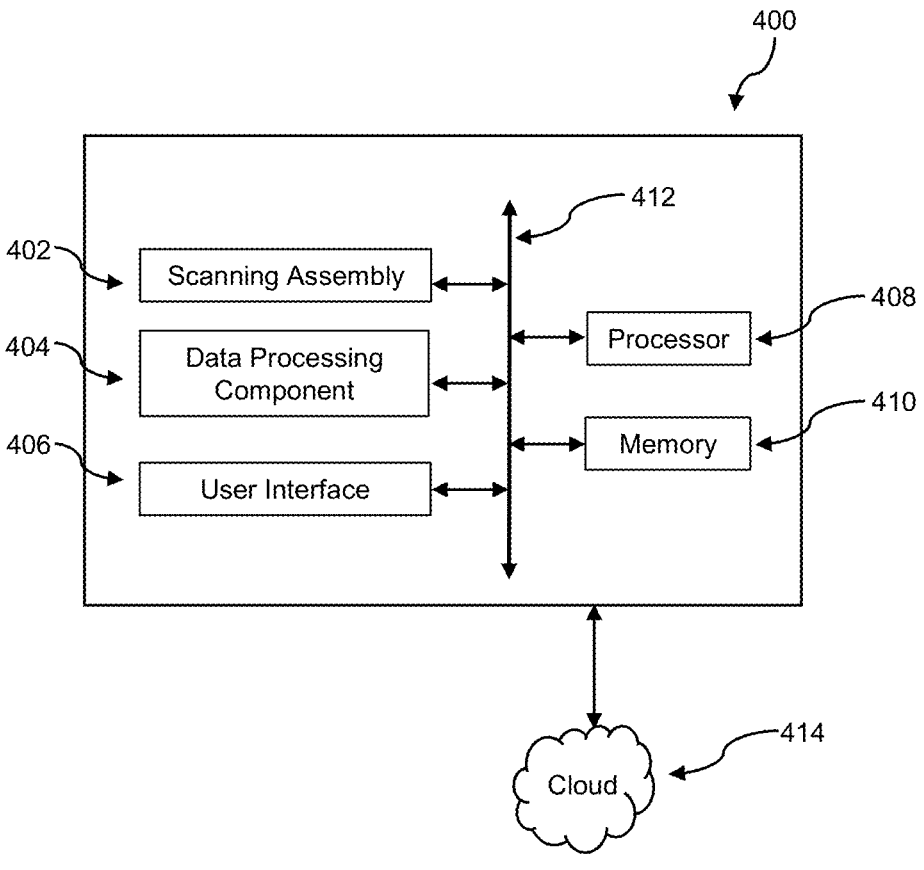
FIG. 4 illustrates a schematic diagram showing an exemplary implementation of facility management system in accordance with one or more example embodiments described herein.

FIG. 4 illustrates a schematic diagram showing an exemplary implementation of facility management system in accordance with one or more example embodiments described herein. In one or more example embodiments, facility management system 400 described herein assesses a condition of one or more packages in a facility. Also, the facility management system 400 described in one or more example embodiments, determines a pattern in which the one or more packages are handled by workers in the facility to assess condition of the one or more packages. In this regard, the facility management system 400 receives data from one or more scanning assemblies. Further, in accordance with one or more example embodiments, the facility management system 400 processes data received from the one or more scanning assemblies to derive one or more insights based on pattern recognition in the data. In this regard, the facility management system 400 derives the one or more insights related to package condition, package holding patterns by the workers, package handling patterns by the workers, activities undertaken by the workers while handling packages, health condition of the workers while handling the packages, and/or the like. Also, in one or more example embodiments, the facility management system 400 utilizes data received from the one or more scanning assemblies to construct one or more models. In this regard, the one or more models can be associated with package condition, package holding patterns by the workers, package handling patterns by the workers, activities undertaken by the workers while handling the packages, health condition of the workers while handling the packages, and/or the like. In this regard, in some example embodiments, the facility management system 400 can construct the one or more models for a specific worker as well. In one or more example embodiments, the facility management system 400 derives the one or more insights using the one or more models too. Further, in some example embodiments, the facility management system 400 provides one or more predictions relevant to the one or more packages based at least on the one or more derived insights. Accordingly, in one or more example embodiments, the system 400 facilitates a practical application of data analytics technology and/or digital transformation technology to continuously assess and monitor condition of the one or more packages in the facility.

In some example embodiments, the facility management system 400 is a server system (e.g., a server device) that facilitates a data analytics platform between one or more computing devices, one or more data sources, and/or one or more assets in the facility. In some example embodiments, the facility management system 400 is a device with one or more processors and a memory. Whereas in some example embodiments, the facility management system 400 is implementable via the cloud 414. The facility management system 400 is implementable in one or more facilities related to one or more technologies, for example, but not limited to, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

In some example embodiments, the facility management system 400 comprises one or more components such as, a scanning assembly 402, a data processing component 404, and/or a user interface 406. Additionally, the facility management system 400 can comprise a processor 408 and/or a memory 410. In one or more example embodiments, one or more components of the facility management system 400 may be communicatively coupled to the processor 408 and/or the memory 410 via a bus 412. In certain example embodiments, one or more aspects of the facility management system 400 (and/or other systems, apparatuses and/or processes disclosed herein) constitute executable instructions embodied within a computer-readable storage medium (e.g., the memory 410). For instance, in an example embodiment, the memory 410 stores computer executable component and/or executable instructions (e.g., program instructions). Furthermore, the processor 408 facilitates execution of the computer executable components and/or the executable instructions (e.g., the program instructions). In an example embodiment, the processor 408 is configured to execute instructions stored in memory 410 or otherwise accessible to the processor 408.

The processor 408 is a hardware entity (e.g., physically embodied in circuitry) capable of performing operations according to one or more embodiments of the disclosure. Alternatively, in an example embodiment where the processor 408 is embodied as an executor of software instructions, the software instructions configure the processor 408 to perform one or more algorithms and/or operations described herein in response to the software instructions being executed. In an example embodiment, the processor 408 is a single core processor, a multi-core processor, multiple processors internal to the facility management system 400, a remote processor (e.g., a processor implemented on a server), and/or a virtual machine. In certain example embodiments, the processor 408 is in communication with the memory 410, the scanning assembly 402, the data processing component 404, and/or the user interface 406 via the bus 412 to, for example, facilitate transmission of data between the processor 408, the memory 410, the scanning assembly 402, the data processing component 404, and/or the user interface 406. In some example embodiments, the processor 408 may be embodied in a number of different ways and, in certain example embodiments, includes one or more processing devices configured to perform independently. Additionally or alternatively, in one or more example embodiments, the processor 408 includes one or more processors configured in tandem via bus 412 to enable independent execution of instructions, pipelining of data, and/or multi-thread execution of instructions.

The memory 410 is non-transitory and includes, for example, one or more volatile memories and/or one or more non-volatile memories. In other words, in one or more example embodiments, the memory 410 is an electronic storage device (e.g., a computer-readable storage medium). The memory 410 is configured to store information, data, content, one or more applications, one or more instructions, or the like, to enable the facility management system 400 to carry out various functions in accordance with one or more embodiments disclosed herein. In accordance with some example embodiments described herein, the memory 410 may correspond to an internal or external memory of the facility management system 400. In some examples, the memory 410 may correspond to a database communicatively coupled to the facility management system 400. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

The scanning assembly 402 of the facility management system 400 can be same as that of one or more scanning assemblies 104 described in accordance with FIG. 1 of the current disclosure. In one or more example embodiments, the scanning assembly 402 is associated with each worker of one or more workers in the facility. Said alternatively, each worker can carry or wear an associated scanning assembly 402 while handling a package in the facility. For example, the scanning assembly 402 can be configured to be worn attached to a worker's hand. In another example, another scanning assembly 402 can be configured to be worn attached to a worker's wrist, palm, arm, and/or the like. In one or more example embodiments, the scanning assembly 402 comprises one or more sensors. In this regard, the one or more sensors can be, but not limited to a mechanomyogram (MMG) sensor, an electromyogram (EMG) sensor, a gyroscope, and an accelerometer. Further, in one or more example embodiments, the one or more sensors of the scanning assembly 402 collects data associated with activities undertaken by the one or more workers while handling the packages in the facility. For example, a worker picking a package (say, at a first location in the facility), a worker placing a package (say, at a second location in the facility), a worker holding a package in the facility, and/or the like can correspond to the activities undertaken by the one or more workers. Also, in some example embodiments, the one or more sensors of the scanning assembly 402 collects data associated with health of the one or more workers while handling the packages in the facility.

Also, in some example embodiments, the scanning assembly 402 provides one or more instructions to a worker. For example, the one or more instructions can correspond to a pick instruction that instructs the worker to pick a package from a location in the facility, a place instruction that instructs the worker to place a package at another location in the facility, a corrective instruction that instructs the worker to properly hold a package, and/or the like. In accordance with the one or more instructions, the worker can perform a corresponding activity to handle a package. Further, in one or more example embodiments, the scanning assembly 402 collects data associated with the corresponding activity performed by the worker while handling the package. For example, in response to the worker picking a package and/or holding a package, the mechanomyogram (MMG) sensor and the electromyogram (EMG) sensor of the scanning assembly 402 collects data associated with muscle stiffness, muscle contraction, and/or other muscular activities of the worker. In another example, in response to the worker walking a certain distance to pick or place a package, the gyroscope and the accelerometer of the scanning assembly 402 collects data associated with orientation, position, and velocity of worker's hand and/or worker's body. Additionally, in some example embodiments, the scanning assembly 402 comprises one or more additional sensors that collect health data of the worker handling a package in the facility. Exemplary scanning assemblies are described further in accordance with FIGS. 5A and 5B of the current disclosure.

In one or more example embodiments, the data processing component 404 receives data collected by the scanning assembly 402. Further, in one or more example embodiments, the data processing component 404 processes and analyses the received data. Also, in some example embodiments, the data processing component 404 determines a package holding pattern and/or a package handling pattern based at least in part on the received data. In this regard, the data processing component 404 derives the one or more insights based at least on the analysis of the received data. The one or more insights can be related to package condition, package holding patterns by the workers, package handling patterns by the workers, activities undertaken by the workers while handling packages, health condition of the workers while handling the packages, and/or the like. For example, an insight of the one or more insights can be indicative of a cause for damaged package and/or a specific package handling pattern by a worker. In another example, an insight of the one or more insights can be indicative of a prediction of damage that is likely to happen to a package based on a package handling pattern by a worker. Further, in another example, an insight of the one or more insights can be indicative of an action to be taken to avoid damage to a package. Also, in another example, an insight of the one or more insights can be indicative of an action to be taken to address a cause for damaged package and/or a specific package handling pattern by a worker. Yet in another example, an insight of the one or more insights can be indicative of a package holding pattern and/or a package handling pattern by a worker as well.

In certain example embodiments, the data processing component 404 can selectively process and analyze the received data to derive specific insights. According to this aspect, in an example embodiment, the data processing component 404 can derive specific insights at a specific stage of handling a package. Said alternatively, the data processing component 404 can derive specific insights when a worker picks a package, when a worker holds a package, when a worker carries a package, and/or when a worker places a package. Accordingly, in an example embodiment, to derive insights when a worker picks a package and/or holds the package, the data processing component 404 selectively processes data received from first sensors say, mechanomyogram (MMG) and electromyogram (EMG) sensors of the one or more sensors. In some example embodiments, at least a portion of data received from the first sensors can correspond to one or more voltage measurements. In this regard, the data processing component 404 processes data associated with muscle stiffness, muscle contraction, and/or other muscular activities of the worker. Further, the data processing component 404 compares the data received from the first sensors with one or more first threshold values to derive specific insights when the worker picks the package and/or holds the package. Specifically, in some example embodiments, the data processing component 404 compares the one or more voltage measurements with a first threshold voltage to derive the specific insights. For example, an insight can correspond to a determination if the worker is holding the package or not. In accordance with this example, the data processing component 404 determines that the worker is holding the package if the comparison of data received from the first sensors exceeds the one or more first threshold values. Whereas the data processing component 404 determines that the worker is not holding the package if the comparison of data received from the first sensors does not exceed the one or more first threshold values. In another example, an insight can correspond to an identification of a package holding pattern which can indicate if the worker is properly holding the package or not. Further, in another example, an insight can correspond to a determination if a package holding pattern complies with one or more normal package holding patterns. Furthermore, in an example, an insight can represent a package holding pattern itself. Yet in another example, an insight can correspond to a prediction that the package is likely to get damaged based on a package holding pattern. Also, in another example, an insight can correspond to an indication of muscle fatigue for the worker and that the worker is likely to mishandle say, drop the package.

Based at least on the specific insights, in some example embodiments, the data processing component 404 provides one or more notifications and/or corrective actions. For example, a notification can correspond to an alert to the worker to properly hold the package if the worker is not properly holding the package or if a package holding pattern is likely to cause damage to the package. In another example, a corrective action can correspond to a recommendation for break to the worker or a training requirement for the worker. Additionally, in an example embodiment, the data processing component 404 can also process data received from second sensors say, gyroscopes and/or accelerometers of the one or more sensors to derive insights when the worker picks the package and/or holds the package.

Further, in an example embodiment, upon picking and holding the package at a first location, the worker can carry the package to place it at another location say, a second location in the facility. Accordingly, in an example embodiment, the data processing component 404 selectively processes data received from the second sensors say, gyroscopes and/or accelerometers of the one or more sensors to derive insights when the worker carries the package and/or places the package. In some example embodiments, at least a portion of data received from second sensors can correspond to one or more acceleration measurements, one or more angular velocity measurements, and/or the like. Also, in some example embodiments, at least a portion of the second data represents a package handling pattern. In this regard, the data processing component 404 processes data associated with orientation, position, and velocity of worker's hand and/or worker's body. Per this aspect, in some example embodiments, the one or more acceleration measurements can be represented as one or more voltage values as well. Further, the data processing component 404 determines a package handling pattern based at least in part on the second data. Furthermore, the data processing component 404 compares the data received from the second sensors with one or more second threshold values to derive specific insights when the worker carries the package and/or places the package. For example, an insight can correspond to a determination if the worker is properly handling the package or not. In accordance with this example, the data processing component 404 determines that the worker is properly handling the package if the comparison of data received from the second sensors exceeds the one or more second threshold values. Whereas the data processing component 404 determines that the worker is not properly handling the package if the comparison of data received from the second sensors does not exceed the one or more second threshold values. In another example, an insight can correspond to a determination if a package handling pattern complies with one or more normal package handling patterns. Further, in another example, an insight can correspond to a prediction that the package is likely to get damaged based on a package handling pattern. Furthermore, in an example, an insight can represent a package handling pattern itself. Yet in another example, an insight can correspond to a determination that a specific package handling pattern caused damage to a package upon placing the package. Also, in another example, an insight can correspond to an indication that the worker is likely to slip and that the worker is likely to mishandle the package. Yet in another example, an insight can correspond to an indication that the worker is unscientifically handling the package or is not using essential equipment to handle the package.

Further, in accordance with some example embodiments, the data processing component 404 determines smoothness associated with a package handling pattern of the worker based at least in part on the data received from the second sensors. In this regard, the data processing component 404 also derives the specific insights based on the smoothness associated with the package handling pattern as well. In addition, in some example embodiments, the data processing component 404 classifies the package handling pattern of the worker as soft package handling pattern or rough package handling pattern based on the smoothness associated with the package handling pattern. Further, in accordance with this aspect, the data processing component 404 provides a rating for the package handling pattern based on the smoothness associated with the package handling pattern for a package. In this regard, the data processing component 404 provides the rating on a scale of 0-10 (said as 0 to 10) for the package handling pattern. For example, rating 0 can represent soft or smoothest package handling pattern which causes no damage to the package. While rating 10 can represent rough or harshest package handling pattern which causes damage to the package. Whereas intermediate ratings can represent intermediate package handling patterns based on an intensity of damage to the package.

Based at least on the specific insights, in an example embodiment, the data processing component 404 provides one or more notifications and/or corrective actions. For example, a notification can correspond to an alert to the worker to properly handle the package if the worker is not properly handling the package or if a package handling pattern is likely to cause damage to the package. In another example, a corrective action can correspond to a recommendation to the worker to use a specific equipment to handle a package or a training requirement for the worker. Yet in another example, a notification can correspond to advice for the worker to reduce walking speed. Additionally, in an example embodiment, the data processing component 404 can also process data received from first sensors say, mechanomyogram (MMG) and electromyogram (EMG) sensors of the one or more sensors to derive insights when the worker carries the package and/or places the package.

Further, in one or more example embodiments, the data processing component 404 of the facility management system 400 can comprise one or more machine learning algorithms. In this regard, the data processing component 404 utilizes the one or more machine learning algorithms to provide the one or more insights described herein. In some example embodiments, the one or more machine learning algorithms can be trained with datasets in order to provide the one or more insights. In some example embodiments, the datasets can correspond to standard package handling patterns and/or standard package holding patterns. Whereas in some example embodiments, the datasets can correspond to package handling patterns and/or package holding patterns of one or more workers in the facility. Further, in some example embodiments, the datasets can also correspond to activity data and/or health data associated with the one or more workers in the facility. In addition, in accordance with some example embodiments, the datasets can also correspond to data received from first and second sensors as well. In some example embodiments, the one or more machine learning algorithms can be trained in near real time with the datasets that correspond to package handling patterns and/or package holding patterns for a specific worker in the facility. In this regard, the one or more machine learning algorithms learn over time to provide improved and accurate insights. Also, in some example embodiments, the data processing component 404 constructs one or more models associated with package condition, package holding patterns by the workers, package handling patterns by the workers, activities undertaken by the workers while handling the packages, health condition of the workers while handling the packages, and/or the like based at least on the one or more machine learning algorithms. Also, in some example embodiments, the one or more machine learning algorithms can be trained with one or more new datasets on a regular basis or for a pre-defined time interval.

Further, in one or more example embodiments, the one or more insights provided by the data processing component 404 can be transmitted to the user interface 406. In some example embodiments, the user interface 406 can correspond to an interface of a mobile device associated with the worker in the facility. In some example embodiments, the user interface 406 can correspond to an interface of a mobile device associated with a supervisor of the worker in the facility. In this regard, the one or more insights can be rendered as a dashboard on the user interface 406. In some example embodiments, the dashboard provides rankings and/or performance of one or more workers in the facility. Also, in some example embodiments, the dashboard provides relative rankings and/or performance of one or more workers in the facility. In addition, in some example embodiments, the dashboard displays a set of workers who need to be trained. Also, in one or more example embodiments, the one or more notifications and/or corrective actions provided by the data processing component 404 can be transmitted to the user interface 406. In some example embodiments, the one or more notifications can be visual notifications. Whereas in some example embodiments, the one or more notifications can be audio notifications.

In some example embodiments, one or more components, processor 408 and/or memory 410 of the facility management system 400 may be communicatively coupled to the cloud 414 over a network. In this regard, one or more components, processor 408 and/or memory 410 along with the cloud 414 can continuously assess and/or monitor condition of the one or more packages in the facility. In some example embodiments, the network may be for example, a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, a BACnet network, a NIAGARA network, a NIAGARA CLOUD network, and/or another type of network. In some example embodiments, data received from the scanning assembly 402 can be transmitted to the cloud 414. According to some example embodiments, the facility management system 400 may additionally comprise a gateway. In this regard, the gateway may be configured to transmit data received from the scanning assembly 402 to the cloud 414. Further, in some example embodiments, the cloud 414 can be configured to perform analysis on the data and/or derive one or more insights based on the analysis of the data. Further, in some example embodiments, the cloud 414 can transmit one or more insights to the user interface 406 for display. Also, in some example embodiments, the cloud 414 can create one or more models associated with package condition, package holding patterns by the workers, package handling patterns by the workers, activities undertaken by the workers while handling the packages, health condition of the workers while handling the packages, and/or the like. In some example embodiments, the cloud 414 may be configured to perform one or more operations/functionalities of one or more components, processor 408 and/or memory 410 of the facility management system 400 in order to continuously assess and/or monitor condition of the one or more packages in the facility.

Figure 5A:
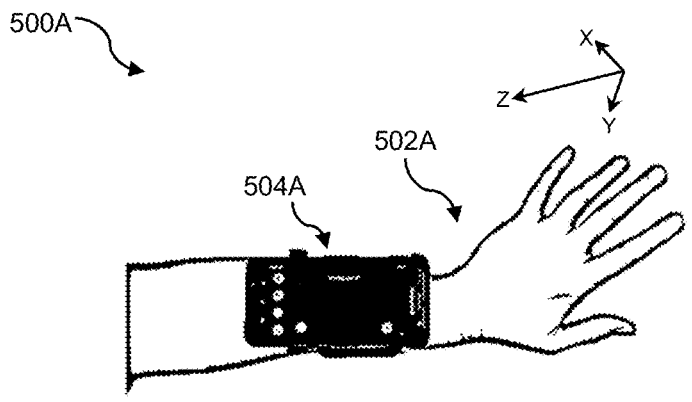
FIG. 5A illustrates a schematic diagram showing an exemplary scanning assembly in accordance with one or more example embodiments described herein.

FIG. 5A illustrates a schematic diagram showing an exemplary scanning assembly in accordance with one or more example embodiments described herein. An example scanning assembly 500A illustrated herein comprises a mobile computing device 504A worn on wrist of a worker's hand 502A. In one or more example embodiments, the mobile computing device 504A can be communicatively coupled to data processing component 404, processor 408, memory 410, and/or cloud 414 of the facility management system 400 described in accordance with FIG. 4 of the current disclosure. In this regard, the mobile computing device 504A can be communicatively coupled to data processing component 404, processor 408, memory 410, and/or cloud 414 via network which can be, but not limited to a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, a BACnet network, a NIAGARA network, a NIAGARA CLOUD network, and/or another type of network. In some example embodiments, the mobile computing device 504A can scan a barcode associated with the one or more packages in the facility. Whereas in some example embodiments, the mobile computing device 504A can read a Radio Frequency Identification (RFID) tag associated with the one or more packages in the facility. In some example embodiments, the scanning assembly 500A comprises one or more parts such as armbands, rubber pads, and/or sleds. In this regard, the one or more parts of the scanning assembly 500A facilitate proper positioning of the mobile computing device 504A on the worker's hand 502A. Also, in some example embodiments, the one or more parts of the scanning assembly 500A are detachably coupled to each other.

Further, in some example embodiments, the mobile computing device 504A provides one or more instructions to a worker in order to handle the one or more packages. For example, an instruction of the one or more instructions can correspond to a pick instruction. In another example, an instruction of the one or more instructions can correspond to a place instruction. Yet in another example, an instruction of the one or more instruction can correspond to a notification and/or a corrective instruction. In some example embodiments, the mobile computing device 504A can provide the one or more instructions via an interface of the mobile computing device 504A. In some example embodiments, the interface of the mobile computing device 504A can be similar to that of user interface 406 described in accordance with FIG. 4 of the current disclosure. Also, in some example embodiments, the mobile computing device 504A can provide the one or more instructions as vocal instructions via a speaker (not shown) of the mobile computing device 504A.

In one or more example embodiments, the exemplary scanning assembly 500A illustrated herein comprises one or more sensors which can be, but not limited to a mechanomyogram (MMG) sensor, an electromyogram (EMG) sensor, a gyroscope, and an accelerometer. In this regard, according to some example embodiments, the one or more sensors can be placed in the one or more parts of the scanning assembly 500A. According to this aspect, in some example embodiments, the one or more sensors can be placed in an armband of the scanning assembly 500A so that the one or more sensors contact the worker's hand 502A. For example, the mechanomyogram (MMG) sensor and the electromyogram (EMG) sensor can be placed in the armband of the scanning assembly 500A. Also, in some example embodiments, the armband can comprise one or more vents to support placement of the one or more sensors. For example, the mechanomyogram (MMG) sensor and the electromyogram (EMG) sensor can be placed in the one or more vents of the armband. In accordance with this example, the one or more vents allow penetration of signals (say, visible light, infrared light, and/or the like) from the electromyogram (EMG) sensor to fall on the worker's hand 502A. In this regard, the mechanomyogram (MMG) sensor and the electromyogram (EMG) sensor collect data associated with muscle stiffness, muscle contraction, and/or other muscular activities of the worker. In addition, in accordance with some example embodiments, the gyroscope and the accelerometer can be combined together to form an inertial measurement unit (IMU). In this regard, the gyroscope and the accelerometer of the inertial measurement unit (IMU) collect data associated with orientation, position, and velocity of worker's hand and/or worker's body. Also, according to some example embodiments, the inertial measurement unit (IMU) provides two to six degrees of freedom (DOF) to determine orientation, position, and velocity of worker's hand and/or worker's body. Said alternatively, the scanning assembly 500A has two to six degrees of freedom (DOF) to determine orientation, position, and velocity of worker's hand and/or worker's body.

Further, in one or more example embodiments, the one or more sensors of the scanning assembly 500A collects data associated with one or more activities undertaken by a worker while handling a package in the facility. For example, if an activity corresponds to a worker picking or holding a package, then the mechanomyogram (MMG) sensor and the electromyogram (EMG) sensor collects data associated with muscle stiffness, muscle contraction, and/or other muscular activities of the worker. In another example, if an activity corresponds to a worker carrying or placing a package, the gyroscope and the accelerometer collects data associated with orientation, position, and velocity of worker's hand and/or worker's body. In this regard, the scanning assembly 500A determines a plane (XY, XZ, or YZ) along which the force of gravity exists. Additionally, in some example embodiments, the scanning assembly 500A can comprise proximity sensors, position transducers, resolvers, encoders, rotary sensors, or the like. Accordingly, in some example embodiments, the data collected by the scanning assembly 500A can be transmitted to data processing component 404, processor 408, memory 410, and/or cloud 414 of the facility management system 400 for further processing and analysis as described in accordance with FIG. 4 of the current disclosure. Though the scanning assembly 500A is described to be worn on the worker's hand 502A, the scanning assembly 500A can be configured to be worn on other parts of worker's body such as worker's torso, palm, forearm, arm, and/or the like.

Figure 5B:
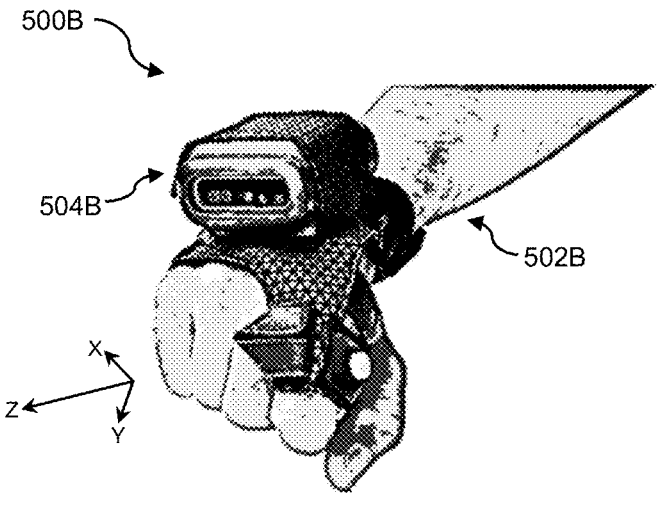
FIG. 5B illustrates a schematic diagram showing another exemplary scanning assembly in accordance with one or more example embodiments described herein.

FIG. 5B illustrates a schematic diagram showing another exemplary scanning assembly in accordance with one or more example embodiments described herein. An example scanning assembly 500B illustrated herein comprises a mobile computing device 504B worn on back of a worker's hand 502B. In accordance with one or more example embodiments, the mobile computing device 504B described herein can perform one or more functions/operations similar to that of mobile computing device 504A described in accordance with FIG. 5A of the current disclosure. Accordingly, in some example embodiments, the scanning assembly 500B can perform one or more functions/operations similar to that of scanning assembly 500A described in accordance with FIG. 5A of the current disclosure. Though the scanning assembly 500B is described to be worn on back of the worker's hand 502B, the scanning assembly 500A can be configured to be worn on other parts of worker's body such as worker's torso, palm, forearm, arm, and/or the like.

Figure 6:
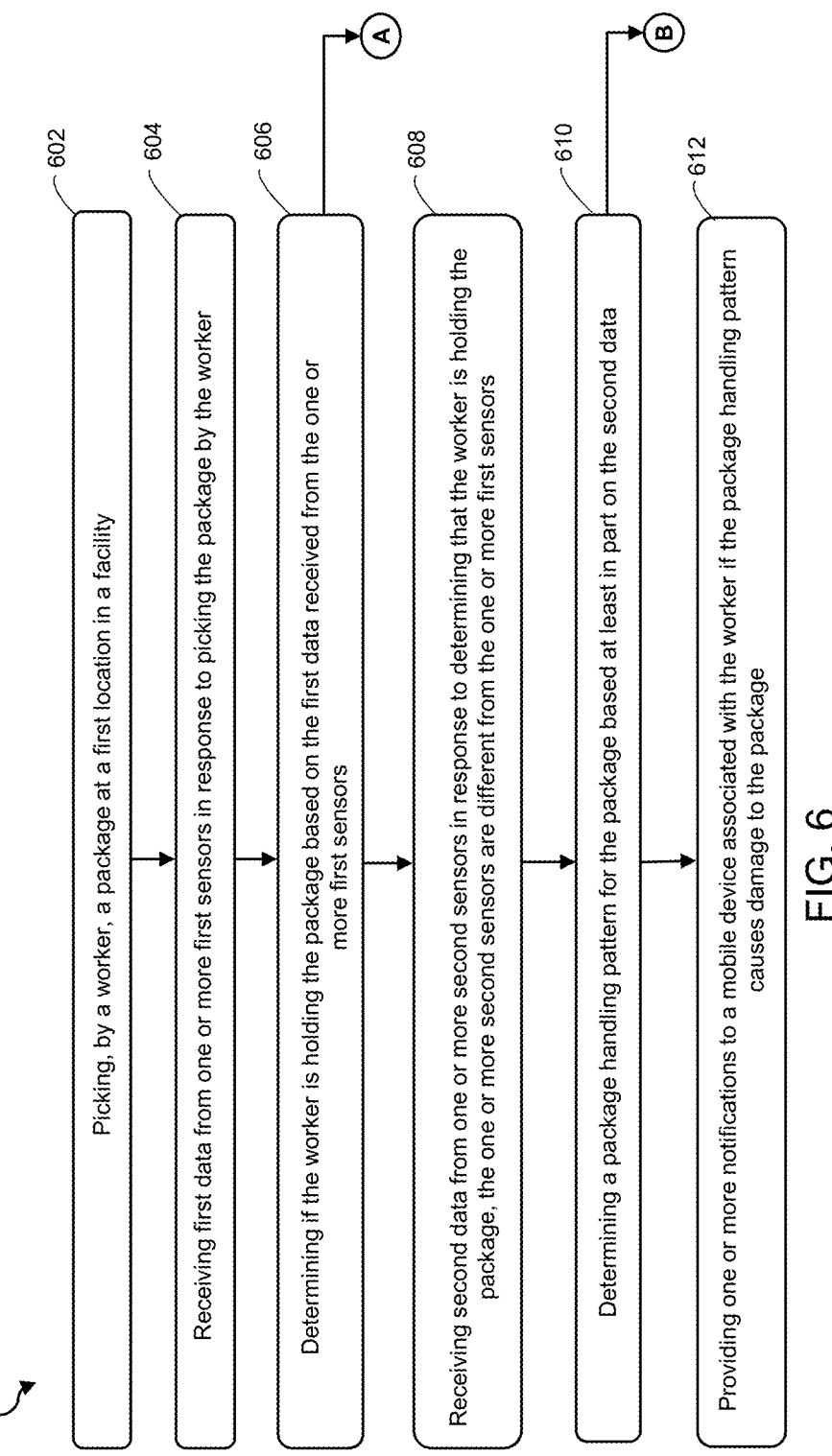
FIG. 6 illustrates a flowchart showing a method described in accordance with some example embodiments described herein.

FIG. 6 illustrates a flowchart showing a method described in accordance with some example embodiments described herein. An exemplary flowchart 600 describes an exemplary method for assessing a condition of a package in a facility in accordance with one or more example embodiments described herein. At step 602, a worker can pick the package from a first location in the facility. For example, the worker can pick the package in response to receiving a pick instruction via scanning assembly 402 of the facility management system 400. At step 604, the facility management system 400 receives first data from one or more first sensors of the scanning assembly 402 in response to the worker picking the package. At step 606, the facility management system 400 comprises means, such as data processing component 404 to determine if the worker is holding the package based on the first data received from the one or more first sensors. At step 608, the facility management system 400 receives second data from one or more second sensors of the scanning assembly 402 in response to determining that the worker is holding the package. In this regard, the one or more second sensors can be different from the one or more first sensors. At step 610, the facility management system 400 comprises means, such as data processing component 404 to determine a package handling pattern for the package based at least in part on the second data. At step 612, the facility management system 400 comprises means, such as data processing component 404 and/or user interface 406 to provide one or more notifications to a mobile device associated with the worker if the package handling pattern causes damage to the package.

FIG. 7 illustrates a flowchart showing a method described in accordance with some example embodiments described herein. An exemplary flowchart 700 describes an exemplary method for determining if a worker is holding a package in accordance with one or more example embodiments described herein. At step 702, the facility management system 400 comprises means, such as data processing component 404 to compare first data received from one or more first sensors with one or more first threshold values. In this regard, the first data received from the one or more first sensors comprises at least one of muscle stiffness and muscle contraction data of the worker such that the one or more first sensors comprises a mechanomyogram (MMG) sensor and an electromyogram (EMG) sensor. At step 704, the facility management system 400 comprises means, such as data processing component 404 to determine that the worker is holding the package if the comparison of the first data exceeds the one or more first threshold values. At step 706, the facility management system 400 comprises means, such as data processing component 404 to identify a package holding pattern of the worker based at least in part on the first data. At step 708, the facility management system 400 comprises means, such as data processing component 404 and/or user interface 406 to provide one or more first notifications to a mobile device associated with the worker if the package holding pattern causes damage to the package.

FIG. 8 illustrates a flowchart showing a method described in accordance with some example embodiments described herein. At step 802 of the exemplary flowchart 800, the facility management system 400 comprises means, such as data processing component 404 to compare second data with one or more second threshold values. In this regard, the second data can be received from one or more second sensors of scanning assembly 402 such that the second data comprises data associated with orientation, position, and velocity of at least one of worker's hand and worker's body such that the one or more second sensors comprises a gyroscope and an accelerometer. At step 804 of the exemplary flowchart 800, the facility management system 400 comprises means, such as data processing component 404 to identify that the package handling pattern causes damage to the package if the comparison of the second data exceeds the one or more second threshold values.

FIG. 9 illustrates a flowchart showing a method described in accordance with some example embodiments described herein. At step 902 of the exemplary flowchart 900, the facility management system 400 comprises means, such as data processing component 404 and/or user interface 406 to provide one or more notifications to one or more mobile devices associated with a supervisor of a worker if a package handling pattern causes damage to a package. In this regard, the one or more notifications can be at least one of: an audio notification and a visual notification. At step 904 of the exemplary flowchart 900, the facility management system 400 comprises means, such as data processing component 404 to identify a cause for damage based at least in part on first data received from one or more first sensors and second data received from one or more second sensors. At step 906 of the exemplary flowchart 900, the facility management system 400 comprises means, such as data processing component 404 and/or user interface 406 to provide one or more instructions to the worker via a mobile device associated with the worker such that the one or more instructions comprises at least one of: a pick instruction, a place instruction, and a corrective instruction.

FIG. 10 illustrates a flowchart showing a method described in accordance with some example embodiments described herein. At step 1002 of the exemplary flowchart 1000, a worker can place a package at a second location in a facility. For example, the worker can place the package in response to receiving a place instruction via scanning assembly 402 of the facility management system 400. At step 1004 of the exemplary flowchart 1000, the facility management system 400 comprises means, such as data processing component 404 to determine a package handling pattern for the package based at least in part on second data received from one or more second sensors. According to this aspect, the package handling pattern can be determined in response to placing the package at the second location. At step 1006 of the exemplary flowchart 1000, the facility management system 400 comprises means, such as data processing component 404 to identify damage to the package based on the package handling pattern upon placing the package at the second location in the facility.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method for assessing a condition of a package in a facility, the method comprising:

picking, by a worker, the package at a first location in the facility, wherein the package is linked to a scanning assembly positioned on the worker and comprises one or more first sensors and one or more second sensors;

receiving first data from the one or more first sensors in response to picking the package by the worker;

determining if the worker is holding the package based on the first data received from the one or more first sensors;

receiving second data from the one or more second sensors in response to determining that the worker is holding the package, wherein the one or more second sensors are different from the one or more first sensors;

determining a package handling pattern by the worker for the package based at least in part on the second data and application of one or more machine learning algorithms trained on training dataset comprising one or more package handling patterns, activity data, or health data associated with one or more workers associated with the facility; and providing one or more notifications to a mobile device associated with the worker if the package handling pattern causes damage to the package, wherein the one or more notifications is configured at least in part to direct one or more operations associated with package.

2. The method of claim 1, wherein determining if the worker is holding the package based on the first data comprises:

comparing the first data with one or more first threshold values, wherein the first data received from the one or more first sensors comprises at least one of muscle stiffness and muscle contraction data of the worker, and wherein the one or more first sensors comprises a mechanomyogram (MMG) sensor and an electromyogram (EMG) sensor; and determining that the worker is holding the package if the comparison of the first data exceeds the one or more first threshold values.

3. The method of claim 2, further comprising:

identifying a package holding pattern of the worker based at least in part on the first data; and providing one or more first notifications to the mobile device if the package holding pattern causes damage to the package.

4. The method of claim 1, further comprises:

comparing the second data with one or more second threshold values, wherein the second data received from the one or more second sensors comprises data associated with orientation, position, and velocity of at least one of worker's hand and worker's body, and wherein the one or more second sensors comprises a gyroscope and an accelerometer; and identifying that the package handling pattern causes damage to the package if the comparison of the second data exceeds the one or more second threshold values.

5. The method of claim 1, further comprising:

providing the one or more notifications to one or more mobile devices associated with a supervisor of the worker if the package handling pattern causes damage to the package, wherein the one or more notifications comprises at least one of: an audio notification and a visual notification; and identifying a cause for damage based at least in part on the first data and the second data.

6. The method of claim 1, further comprising:

placing, by the worker, the package at a second location in the facility;

determining the package handling pattern for the package based at least in part on the second data in response to placing the package at the second location; and identifying damage to the package based on the package handling pattern upon placing the package at the second location in the facility.

7. The method of claim 1, further comprising:

providing one or more instructions to the worker via the mobile device, wherein the one or more instructions comprises at least one of: a pick instruction, a place instruction, and a corrective instruction.

8. A system for assessing a condition of a package in a facility, the system comprising:

a processor;

a memory communicatively coupled to the processor, wherein the memory comprises one or more instructions which when executed by the processor, cause the processor to:

receive first data from one or more first sensors in response to a worker picking the package at a first location in the facility, wherein the package is linked to a scanning assembly positioned on the worker and comprises the one or more first sensors and one or more second sensors;

determine if the worker is holding the package based on the first data received from the one or more first sensors;

receive second data from the one or more second sensors in response to determining that the worker is holding the package, wherein the one or more second sensors are different from the one or more first sensors;

determine a package handling pattern for the package based at least in part on the second data and application of one or more machine learning algorithms trained on training dataset comprising one or more package handling patterns, activity data, or health data associated with one or more workers associated with the facility; and provide one or more notifications to a mobile device associated with the worker if the package handling pattern causes damage to the package, wherein the one or more notifications is configured at least in part to direct one or more operations associated with package.

9. The system of claim 8, wherein the processor is further configured to:

compare the first data with one or more first threshold values, wherein the first data received from the one or more first sensors comprises at least one of muscle stiffness and muscle contraction data of the worker, and wherein the one or more first sensors comprises a mechanomyogram (MMG) sensor and an electromyogram (EMG) sensor; and determine that the worker is holding the package if the comparison of the first data exceeds the one or more first threshold values.

10. The system of claim 9, wherein the processor is further configured to:

identify a package holding pattern by the worker based at least in part on the first data; and provide one or more first notifications to the mobile device if the package holding pattern causes damage to the package.

11. The system of claim 8, wherein the processor is further configured to:

compare the second data with one or more second threshold values, wherein the second data received from the one or more second sensors comprises data associated with orientation, position, and velocity of at least one of worker's hand and worker's body, and wherein the one or more second sensors comprises a gyroscope and an accelerometer; and identify that the package handling pattern causes damage to the package if the comparison of the second data exceeds the one or more second threshold values.

12. The system of claim 8, wherein the processor is further configured to:

provide the one or more notifications to one or more mobile devices associated with a supervisor of the worker if the package handling pattern causes damage to the package, wherein the one or more notifications comprises at least one of: an audio notification and a visual notification;

identify a cause for damage based at least in part on the first data and the second data; and provide one or more instructions to the worker via the mobile device, wherein the one or more instructions comprises at least one of: a pick instruction, a place instruction, and a corrective instruction.

13. The system of claim 8, wherein the processor is further configured to:

determine the package handling pattern based at least in part on the second data in response to the worker placing the package at a second location in the facility; and identify damage to the package based on the package handling pattern upon placing the package at the second location in the facility.

14. A non-transitory, computer-readable storage medium having stored thereon executable instructions that, when executed by one or more processors, cause the one or more processors to:

receive first data from one or more first sensors in response to a worker picking a package at a first location in a facility, wherein the package is linked to a scanning assembly positioned on the worker and comprises one or more first sensors and one or more second sensors;

determine if the worker is holding the package based on the first data received from the one or more first sensors;

receive second data from the one or more second sensors in response to determining that the worker is holding the package, wherein the one or more second sensors are different from the one or more first sensors;

determine a package handling pattern for the package based at least in part on the second data and application of one or more machine learning algorithms trained on training dataset comprising one or more package handling patterns, activity data, or health data associated with one or more workers associated with the facility; and provide one or more notifications to a mobile device associated with the worker if the package handling pattern causes damage to the package, wherein the one or more notifications is configured at least in part to direct one or more operations associated with package.

15. The non-transitory, computer-readable storage medium of claim 14, wherein the one or more processors is further configured to:

compare the first data with one or more first threshold values, wherein the first data received from the one or more first sensors comprises at least one of muscle stiffness and muscle contraction data of the worker, and wherein the one or more first sensors comprises a mechanomyogram (MMG) sensor and an electromyogram (EMG) sensor; and determine that the worker is holding the package if the comparison of the first data exceeds the one or more first threshold values.

16. The non-transitory, computer-readable storage medium of claim 15, wherein the one or more processors is further configured to:

identify a package holding pattern by the worker based at least in part on the first data; and provide one or more first notifications to the mobile device if the package holding pattern causes damage to the package.

17. The non-transitory, computer-readable storage medium of claim 14, wherein the one or more processors is further configured to:

compare the second data with one or more second threshold values, wherein the second data received from the one or more second sensors comprises data associated with orientation, position, and velocity of at least one of worker's hand and worker's body, and wherein the one or more second sensors comprises a gyroscope and an accelerometer; and identify that the package handling pattern causes damage to the package if the comparison of the second data exceeds the one or more second threshold values.

18. The non-transitory, computer-readable storage medium of claim 14, wherein the one or more processors is further configured to:

provide the one or more notifications to one or more mobile devices associated with a supervisor of the worker if the package handling pattern causes damage to the package, wherein the one or more notifications comprises at least one of: an audio notification and a visual notification; and identify a cause for damage based at least in part on the first data and the second data.

19. The non-transitory, computer-readable storage medium of claim 14, wherein the one or more processors is further configured to:

provide one or more instructions to the worker via the mobile device, wherein the one or more instructions comprises at least one of: a pick instruction, a place instruction, and a corrective instruction.

20. The non-transitory, computer-readable storage medium of claim 14, wherein the one or more processors is further configured to:

determine the package handling pattern based at least in part on the second data in response to the worker placing the package at a second location in the facility; and identify damage to the package based on the package handling pattern upon placing the package at the second location in the facility.

\* \* \* \* \*